Aug. 26, 1941.  E. WOLF  2,254,055

VEHICLE TRANSPORTING DEVICE

Filed Jan. 13, 1940  3 Sheets-Sheet 2

INVENTOR
Edward Wolf
BY
Webster & Webster
ATTORNEYS

Aug. 26, 1941.  E. WOLF  2,254,055
VEHICLE TRANSPORTING DEVICE
Filed Jan. 13, 1940  3 Sheets-Sheet 3

INVENTOR
Edward Wolf
BY
ATTORNEYS

Patented Aug. 26, 1941

2,254,055

UNITED STATES PATENT OFFICE 2,254,055

VEHICLE TRANSPORTING DEVICE

Edward Wolf, Stockton, Calif.

Application January 13, 1940, Serial No. 313,741

4 Claims. (Cl. 254—2)

This invention relates to equipment for car storage garages, display rooms and similar places in which numbers of cars may be disposed and which it is sometimes desirable or necessary to move about without running the cars under their own power.

The principal object of my invention is to provide a combined auto jack and self-propelled vehicle or dolly so arranged and constructed that a car may be easily and quickly shifted, either backwards, forwards or laterally from one parking place in the building to another, with ease and rapidity and with a minimum of effort on the part of the operator.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 4 is a fragmentary plan showing the speed control and reversing mechanism.

Figure 1:
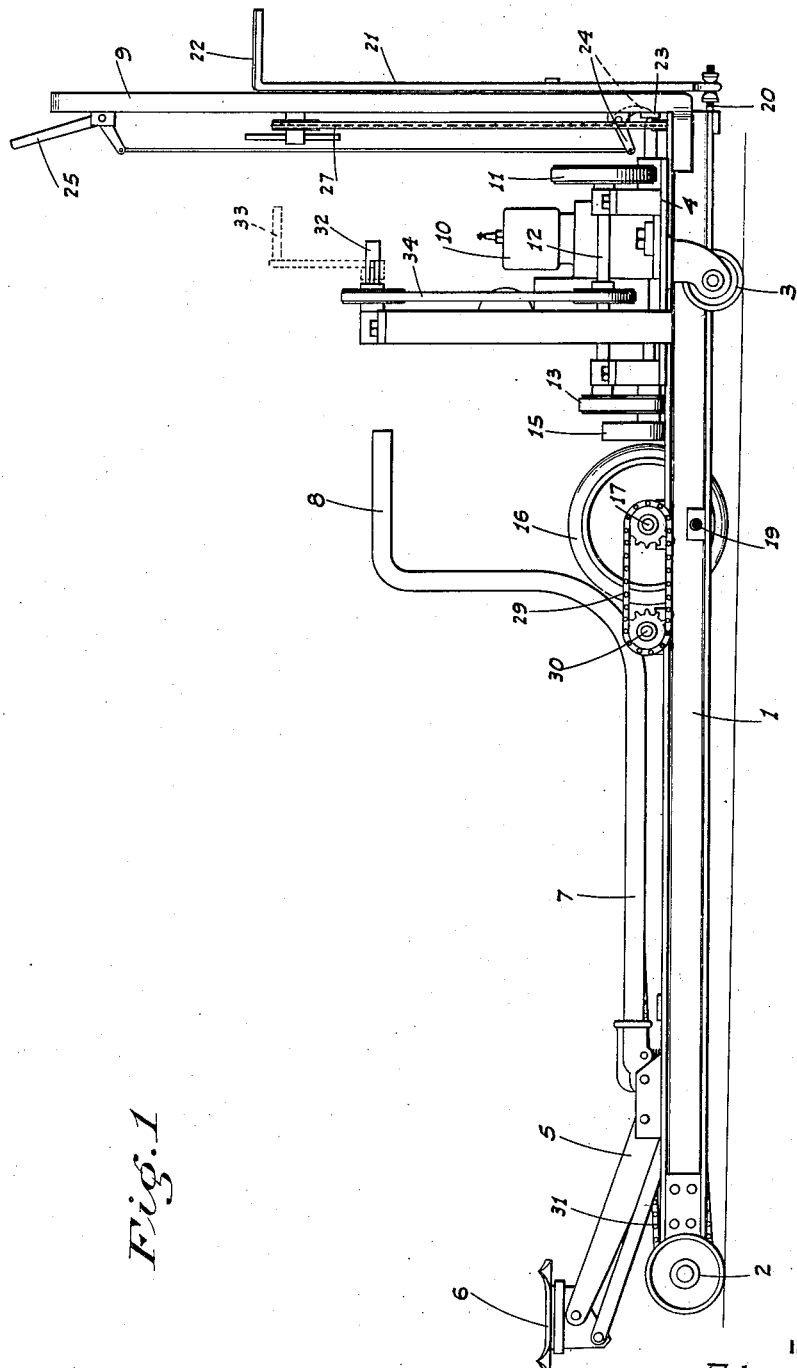
Figure 1 is a side elevation of the apparatus.
Figure 2:
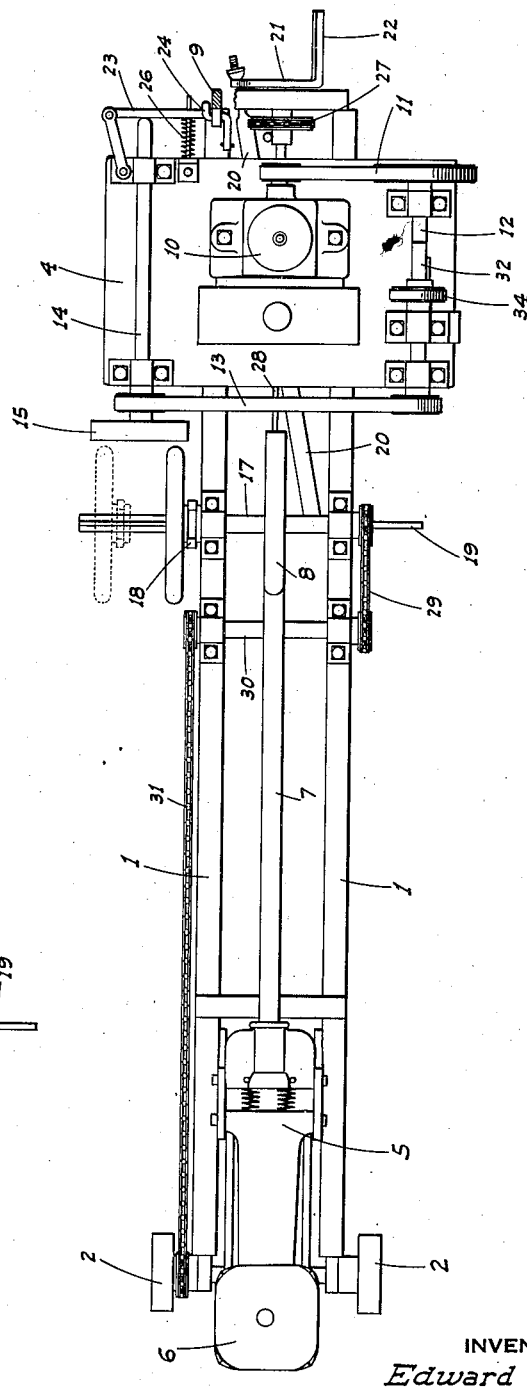
Figure 2 is a top plan view of the same.
Figure 3:
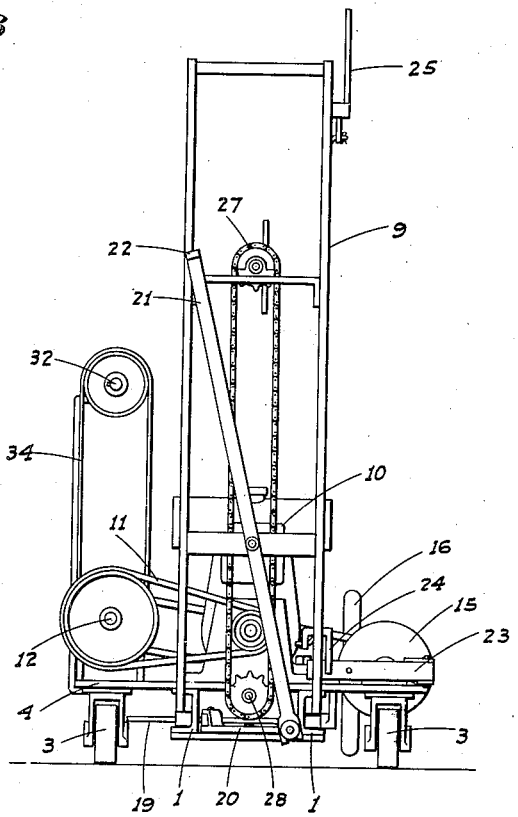
Figure 3 is a rear end elevation of the vehicle.

Referring now more particularly to the characters of reference on the drawings, and particularly at present to Figs. 1 to 4, the device comprises connected and spaced relatively long side frame beams 1 supported near the ground by independently turnable front rollers 2 and adjacent the rear by castor wheels 3 depending from a platform 4 mounted on and overhanging the beams some distance on both sides. This unit forms the chassis of the vehicle or truck.

Mounted between the beams near their forward end is a hydraulic jack of common form indicated at 5, and of the type which is actuated, to raise the swively mounted car engaging pad 6, by the vertical oscillating movement of a rearwardly projecting bar 7. The initial portion of this bar, from the jack forwardly a certain distance, is substantially horizontal and is then bent up and rearwardly to form a relatively elevated operating handle 8. The handle is disposed sufficiently to the rear of the pad so that the overhanging of a modern car rearwardly of the differential housing (the member engaged by the pad) will not interfere with handle operation. The bar being low hung beyond the handle, the truck may be readily swung from side to side about the pad 6 as an axis, when the latter is engaged with a car in lifting relation.

A vertical framework 9 projecting upwardly from the rear end of the truck serves not only as a means to manipulate the truck but also as a mounting means for the control devices of the propelling mechanism now to be described.

This mechanism includes a small gas engine 10 of a type readily obtainable and which is mounted on the platform 4 with its axis disposed lengthwise of the truck. The engine is connected by a belt drive 11 with a countershaft 12 supported from the platform to one side of the engine and which in turn is connected by another belt drive 13 with a shaft 14 slidably supported from the platform on the opposite side of the engine. The forward end of this shaft carries a friction disc 15 adapted to be engaged by a friction wheel 16. The wheel is slidably keyed on another shaft 17 mounted on the beams 1 transversely thereof and ahead of the platform. The wheel is provided with a shifting yoke engaged by a fork 18 rigid with a slide rod 19 mounted under and parallel to shaft 17. A horizontal lever 20 is swively connected to rod 19 and extends thence rearwardly under the platform to the frame 9, being pivotally mounted intermediate its ends for lateral swinging movement to shift rod 19 and fork 18 back and forth as indicated in Fig. 4. At its rear end, lever 20 is swively connected to the lower end of an upstanding lever 21 disposed just behind and pivoted intermediate its ends on the frame 9. At its upper end, lever 21 is formed with a rearwardly projecting handle 22. In this manner the operator of the truck can readily manipulate lever 21 so as to shift wheel 16 relative to disc 15, and thus control the relative speed or direction of rotation of shaft 17.

The shaft 14 is shifted axially, so as to move the disc 15 into or out of frictional driving contact with wheel 16, by means of a horizontal bar 23 extending across the rear end of shaft 14. At one end this bar is pivoted in a fixed position and at the other end is engaged on the back side by one arm of a bellcrank 24 pivoted on frame 9 on the adjacent side. The other end of the bellcrank is connected to an operating handle-bellcrank 25 mounted on the same side of the frame at the top where it is convenient for operation. A spring 26 urges the bar away from the shaft 14.

Mounted on the front side of said frame and also convenient for operation, is a chain drive unit 27 connected at its lower end to a rod 28 which leads forwardly to the usual liquid release valve of the jack.

A chain drive 29 connects the shaft 17 at the end opposite the wheel 16 with another beam-journaled shaft 30 ahead of and parallel to shaft 17. Another chain drive 31 connects shaft 30 with the front roller 2 on the same side.

Since these engines do not have a self starter, I may provide a means for conveniently starting the engine in the form of a short shaft 32 mounted above and parallel to shaft 12 and adapted for releasable driving engagement with a crank handle as indicated at 33. A belt drive 34 or similar arrangement connects the shafts 12 and 32.

Figure 5:
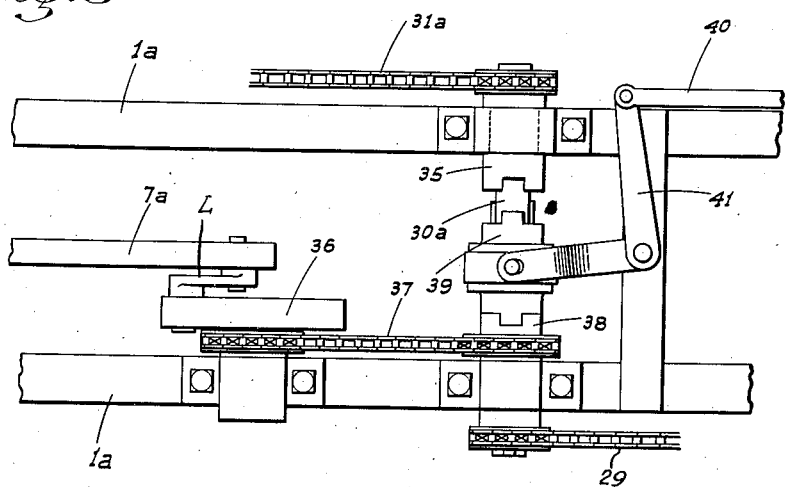
Figure 5 is a fragmentary plan showing a power jack operating mechanism.

Although the operation of the jack by hand is not an arduous physical task with a car of ordinary weight, for heavy duty work I may provide means to operate the jack by power from the engine, as illustrated in Fig. 5. In this case, the rear sprocket of the front roller chain drive 31a is loose on the drive shaft 30a and is rigid with a clutch element 35 inwardly of the adjacent frame beam 1a.

The jack operating bar or lever 7a is connected to a pitman wheel 36 by a link L so as to be oscillated by the rotation of said wheel. The pitman wheel is ahead of shaft 30a and is adapted to be driven therefrom by a chain drive 37 disposed between the beams 1a. The rear sprocket of this drive is free on shaft 30a and is rigid with a clutch element 38 facing element 35. A double clutch unit 39 to engage either of the clutch elements alternately, is slidably keyed on shaft 30a, and may be shifted from the rear of the device by a rod 40 connected to a shifting bellcrank 41 which in turn is connected to unit 39.

The shaft 30a is driven from endless chain 29 which is reversibly driven from the manually controlled drive reversing mechanism hereinbefore described in detail in connection with the embodiment of Figs. 1-4 inclusive.

It will thus be seen that by shifting the clutch unit in alternate directions, the jack may be actuated or the truck propelled either forward or backward.

From the foregoing description it will be readily seen that I have produced such a device as substantially fulfills the objects of the invention as set forth herein.

While this specification set forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A motor vehicle transporting device comprising a low hung, elongated frame having ground engaging rollers supporting the same, a vehicle engaging jack mounted on the frame adjacent one end thereof, the frame and jack, when the latter is lowered, being capable of moving in clearance relation beneath a motor vehicle standing on the ground and to a point with the jack below the vehicle axle, a prime mover mounted on the frame in position to clear the vehicle when the jack is in said position beneath the vehicle axle, a drive assembly for the jack, a separate drive assembly for one of the rollers, and manually actuated means arranged to effect connection of said prime mover in driving relation with said separate drive assemblies selectively and only one at a time.

2. A motor vehicle transporting device comprising a low hung, elongated frame having ground engaging rollers supporting the same, a vehicle engaging jack mounted on the frame adjacent one end thereof, the frame and jack, when the latter is lowered, being capable of moving in clearance relation beneath a motor vehicle standing on the ground and to a point with the jack below the vehicle axle, a prime mover mounted on the frame in position to clear the vehicle when the jack is in said position beneath the vehicle axle, a drive assembly for the jack, a separate drive assembly for one of the rollers, a manually controlled drive reversing mechanism operatively arranged with said prime mover, and separate manually actuated means operative to connect said mechanism in driving relation with said separate drive assemblies selectively, only one at a time, and regardless of the direction of drive of said mechanism.

3. A motor vehicle transporting device comprising a low hung, elongated frame having ground engaging rollers supporting the same, a vehicle engaging jack mounted on the frame adjacent one end thereof, the frame and jack, when the latter is lowered, being capable of moving in clearance relation beneath a motor vehicle standing on the ground and to a point with the jack below the vehicle axle, a prime mover mounted on the frame in position to clear the vehicle when the jack is in said position beneath the vehicle axle, a horizontally disposed shaft journaled on the frame ahead of the prime mover, means driving said shaft from the prime mover, a drive assembly for the jack including a driving member rotatably mounted on said shaft, a separate drive assembly for one of the rollers, said separate assembly including another driving member likewise rotatably mounted on said shaft, adjacent ends of said members being formed with clutch elements, and a manually actuated, cooperating clutch unit slidably and non-rotatably mounted on the shaft between said members, said clutch unit being engageable with said clutch elements selectively and only one at a time.

4. A motor vehicle transporting device comprising a low hung, elongated frame, ground engaging rollers supporting the frame adjacent its ends, a vehicle engaging jack mounted on the frame adjacent its forward end, the frame and jack, when the latter is lowered, being capable of moving in clearance relation beneath a motor vehicle standing on the ground and to a point with the jack below the vehicle axle, a prime mover mounted on the frame adjacent its rear end in position to clear the vehicle when the jack is in said position beneath the vehicle axle, a separate drive assembly for one of the front rollers, a separate drive assembly for the jack, means mounted on the frame between the prime mover and said separate assemblies to effect connection of said prime mover in driving relation to said separate drive assemblies selectively and only one at a time, and a hand control for said means accessible from a point rearwardly of the prime mover.

EDWARD WOLF.